United States Patent
Xu et al.

(10) Patent No.: US 10,448,026 B1
(45) Date of Patent: Oct. 15, 2019

(54) METHOD AND APPARATUS FOR BLOCK VECTOR SIGNALING AND DERIVATION IN INTRA PICTURE BLOCK COMPENSATION

(71) Applicant: Tencent America LLC, Palo Alto, CA (US)

(72) Inventors: Xiaozhong Xu, State College, CA (US); Shan Liu, San Jose, CA (US); Xiang Li, Los Gatos, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/236,027

(22) Filed: Dec. 28, 2018

Related U.S. Application Data

(60) Provisional application No. 62/695,393, filed on Jul. 9, 2018.

(51) Int. Cl.
*H04N 19/105* (2014.01)
*H04N 19/176* (2014.01)
*H04N 19/44* (2014.01)
*H04N 19/159* (2014.01)
*H04N 19/119* (2014.01)

(52) U.S. Cl.
CPC ......... *H04N 19/159* (2014.11); *H04N 19/105* (2014.11); *H04N 19/119* (2014.11); *H04N 19/176* (2014.11); *H04N 19/44* (2014.11)

(58) Field of Classification Search
CPC ... H04N 19/159; H04N 19/105; H04N 19/119
See application file for complete search history.

(56) References Cited

U.S. PATENT DOCUMENTS

| | | | |
|---|---|---|---|
| 9,118,929 B2* | 8/2015 | Lin | H04N 19/56 |
| 9,877,043 B2* | 1/2018 | He | H04N 19/521 |
| 10,027,981 B2* | 7/2018 | Xu | H04N 19/52 |
| 10,075,712 B2 | 9/2018 | Liu et al. | |

(Continued)

OTHER PUBLICATIONS

High Efficiency Video Coding (HEVC), Rec. ITU-T H.265 v4, Dec. 2016.

(Continued)

*Primary Examiner* — Jayanti K Patel
*Assistant Examiner* — Irfan Habib
(74) *Attorney, Agent, or Firm* — Oblon, McClelland, Maier & Neustadt, L.L.P.

(57) ABSTRACT

A method includes determining whether a current block in a current picture is coded in an intra block copy mode. The method includes, in response to the determination that the current block is coded in the intra block copy mode, determining whether a current block vector of the current block is one of (i) a signaled block vector and (ii) a derived block vector. The method includes, in response to determining that the current block vector is the derived block vector: selecting a region in the reference picture, the region divided into a plurality of locations, determining a difference between a template and each of the plurality of locations in the region, deriving the current block vector based on a displacement vector between the current block and a location in the region having a minimum difference, selecting a reference block, and decoding the current block based on the reference block.

20 Claims, 15 Drawing Sheets

(56) References Cited

U.S. PATENT DOCUMENTS

| | | | | |
|---|---|---|---|---|
| 2008/0192825 | A1* | 8/2008 | Lee | H04N 19/50 375/240.12 |
| 2009/0232217 | A1* | 9/2009 | Lee | H04N 19/197 375/240.16 |
| 2016/0057420 | A1* | 2/2016 | Pang | H04N 19/124 375/240.16 |
| 2016/0100163 | A1* | 4/2016 | Rapaka | H04N 19/117 375/240.16 |
| 2016/0330474 | A1* | 11/2016 | Liu | H04N 19/503 |
| 2017/0054996 | A1* | 2/2017 | Xu | H04N 19/52 |
| 2017/0094271 | A1* | 3/2017 | Liu | H04N 19/105 |
| 2017/0195677 | A1* | 7/2017 | Ye | H04N 19/159 |
| 2017/0289566 | A1* | 10/2017 | He | H04N 19/52 |
| 2017/0295370 | A1* | 10/2017 | Xu | H04N 19/52 |
| 2017/0310961 | A1* | 10/2017 | Liu | H04N 19/46 |
| 2018/0048909 | A1* | 2/2018 | Liu | H04N 19/593 |
| 2018/0139461 | A1* | 5/2018 | Liu | H04N 19/82 |
| 2018/0184127 | A1* | 6/2018 | Zhang | H04N 19/82 |
| 2018/0376149 | A1* | 12/2018 | Zhang | H04N 19/11 |

OTHER PUBLICATIONS

Xu et al., "Intra Block Copy in HEVC Screen Content Coding Extensions," IEEE Journal on Emerging and Selected Topics in Circuits and Systems., vol. 6, No. 4, pp. 409-419, 2016.

Liu et al., "Overview of HEVC extensions on screen content coding", APSIPA Transactions on Signal and Information Processing, SIP (2015), vol. 4, e10, 2015.

Joshi et al., "HEVC Screen Content Coding Draft Text 6", JCTVC-W1005, Proceeding of 23rd JCT-VC meeting, San Diego, CA, USA, Feb. 2016.

Lai et al., "AHG14: Intra Block Copy reference area for Wavefront Parallel Processing (WPP)", JCTVC-S0101, Proceeding of the 19th JCT-VC meeting, Strasbourg, France, Oct. 2014.

Xu et al., "Block Vector Prediction in Intra Block Copy for HEVC Screen Content Coding", Data Compression Conference (DCC), Apr. 2015.

Xu et al., "Non-CE2: Intra BC merge mode with default candidates", JCTVC-S0123, Proceeding of the 19th JCT-VC meeting, Strasbourg, France, Oct. 2014.

Sun et al., "Improvements of HEVC SCC Palette Mode and Intra Block Copy", IEEE Journal on Emerging and Slected Topics in Circuits and Systems, vol. 6, No. 4, pp. 433-445, Dec. 2016.

Xu et al., "On chroma motion vector derivation for intra block copy", JCTVC-U0077, Proceeding of the 19th JCT-VC meeting, Wawsaw, Poland, Jun. 2015.

Xu et al., "On Reference Picture List Construction for Intra Block Copy", JCTVC-U0113, Proceeding of the 19th JCT-VC meeting, Wawsaw, Poland, Jun. 2015.

Xu et al., "On Storage of Filtered and Unfiltered Current Decoded Pictures", JCTVC-U0181, Proceeding of the 19th JCT-VC meeting, Wawsaw, Poland, Jun. 2015.

Xu et al., "On intra block copy signalling and constraints", JCTVC-V0056, Proceeding of the 22nd JCT-VC meeting, Geneva, Switzerland, Oct. 2015.

Xu et al., "DPB considerations when current picture is a reference picture", JCTVC-V0057, Proceeding of the 22nd JCT-VC meeting, Geneva, Switzerland, Oct. 2015.

Xu et al., "Bug fix for DPB operations when current picture is a reference picture", JCTVC-W0077, Proceeding of the 23rd JCT-VC meeting, San Diego, CA, USA, Feb. 2016.

Chen et al., "Intra Line Copy for HEVC Screen Content Coding", IEEE Transactions on Circuits and Systems for Video Technology, vol. 27, Issue: 7, pp. 1568-1579, Jul. 2017.

Chen, et al, "Algorithm Description of Joint Exploration Test Model 7 (JEM 7)", JVET-G1001, Joint Video Exploration Team (JVET) of ITU-T SG 16 WP 3 and ISO/IEC JTC 1/SC 29/WG 117th Meeting: Torino, IT, Jul. 13-21, 2017.

Shen et al., "Deformable Motion Model for Frame Rate Up-Conversion in Video Coding", 2016 IEEE Region 10 Conference (TENCON), Nov. 2016.

Kamp et al., "Decoder-Side Motion Vector Derivation for Block-Based Video Coding", IEEE Transactions on Circuits and Systems for Video Technology, vol. 22, Issue: 12, pp. 1732-1745, Dec. 2012.

Venugopal et al., "Intra Region-based Template Matching", JVET-J0039, JVET-J1002, 10th JVET meeting, Apr. 2018.

* cited by examiner

METHOD AND APPARATUS FOR BLOCK VECTOR SIGNALING AND DERIVATION IN INTRA PICTURE BLOCK COMPENSATION

INCORPORATION BY REFERENCE

This present disclosure claims the benefit of priority to U.S. Provisional Application No. 62/695,393, "METHODS FOR BLOCK VECTOR SIGNALING AND DERIVATION IN INTRA PICTURE BLOCK COMPENSATION" filed on Jul. 9, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding using inter-picture prediction with motion compensation has been known for decades. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between the original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from neighboring area's MVs. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

In an intra block copy mode, a block may be reconstructed from another block in the same picture. The intra block copy mode relies on determining a previously decoded reference block based on a block vector. However, identification of a block vector may be time consuming and inefficient. Accordingly, there is a need to improve the efficiency of the intra block copy mode.

SUMMARY

An exemplary embodiment includes a method of video decoding for a video decoder includes acquiring a current picture from a coded video bitstream. The method further includes determining whether a current block in the current picture is coded in an intra block copy mode. The method further includes, in response to the determination that the current block is coded in the intra block copy mode, determining whether a current block vector of the current block is one of (i) a signaled block vector and (ii) a derived block vector. The method further includes, in response to determining that the current block vector is the derived block vector: (i) selecting a region in the reference picture, the region divided into a plurality of locations, (ii) determining a difference between a template and each of the plurality of locations in the region, (iii) deriving the current block vector based on a displacement vector between the current block and a location in the region having a minimum difference with the template with respect to each other location in the region, (iv) selecting a reference block in the current picture based on the derived current block vector, and (v) decoding the current block based on at least one characteristic of the reference block.

An exemplary embodiment includes a video decoder for video decoding. The video decoder includes processing circuitry configured to acquire a current picture from a coded video bitstream. The processing circuitry is further configured to determine whether a current block in the current picture is coded in an intra block copy mode. The processing circuitry is further configured to, in response to the determination that the current block is coded in the intra block copy mode, determine whether a current block vector of the current block is one of (i) a signaled block vector and (ii) a derived block vector. The processing circuitry is further configured to, in response to the determination that the current block vector is the derived block vector: (i) selecting a region in the reference picture, the region divided into a plurality of locations, (ii) determine a difference between a template and each of the plurality of locations in the region, (iii) derive the current block vector based on a displacement vector between the current block and a location in the region having a minimum difference with the template with respect to each other location in the region, (iv) select a reference block in the current picture based on the derived current block vector, and (v) decode the current block based on at least one characteristic of the reference block.

An exemplary embodiment includes non-transitory computer readable medium having instructions stored therein, which when executed by a processor in a video decoder causes the processor to execute a method. The method includes acquiring a current picture from a coded video bitstream. The method further includes determining whether a current block in the current picture is coded in an intra block copy mode. The method further includes, in response to the determination that the current block is coded in the intra block copy mode, determining whether a current block vector of the current block is one of (i) a signaled block vector and (ii) a derived block vector. The method further includes, in response to determining that the current block vector is the derived block vector: (i) selecting a region in the reference picture, the region divided into a plurality of locations, (ii) determining a difference between a template and each of the plurality of locations in the region, (iii) deriving the current block vector based on a displacement vector between the current block and a location in the region having a minimum difference with the template with respect to each other location in the region, (iv) selecting a reference block in the current picture based on the derived current block vector, and (v) decoding the current block based on at least one characteristic of the reference block.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
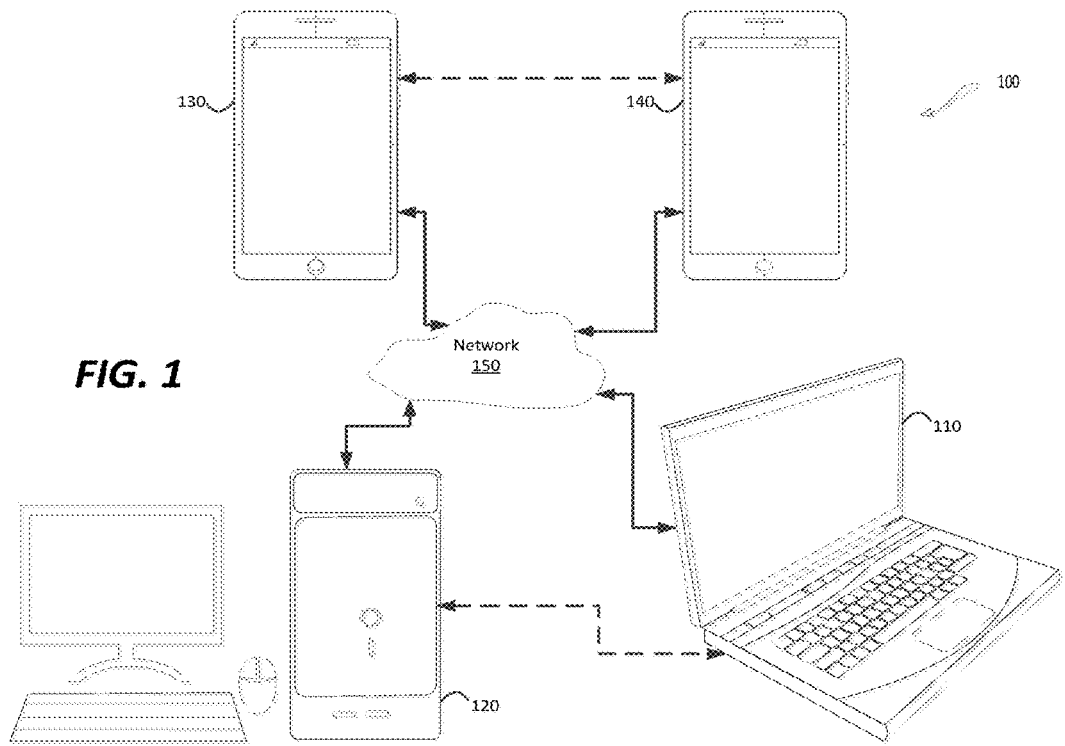
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
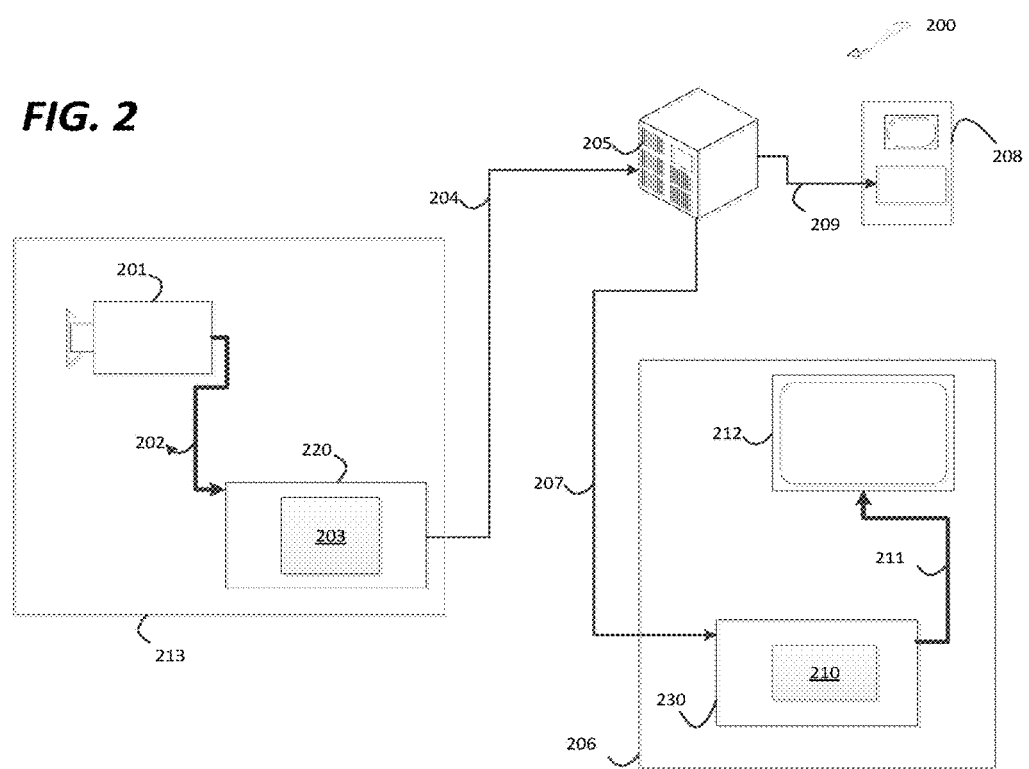
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
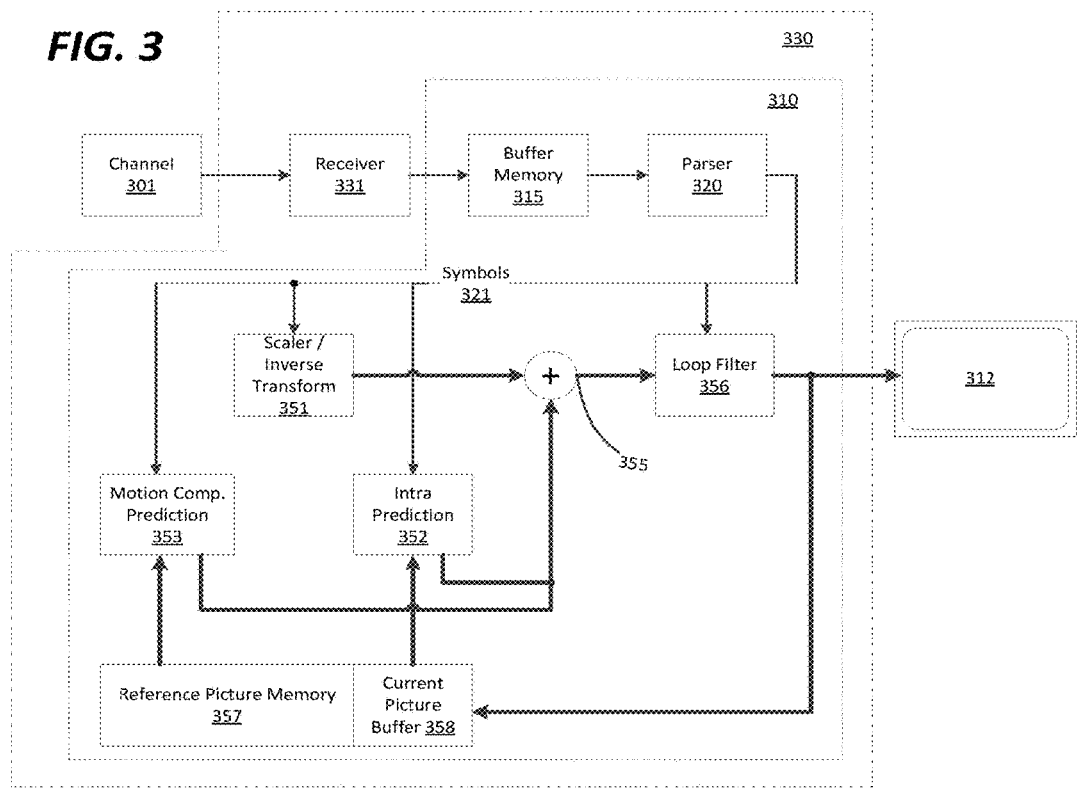
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
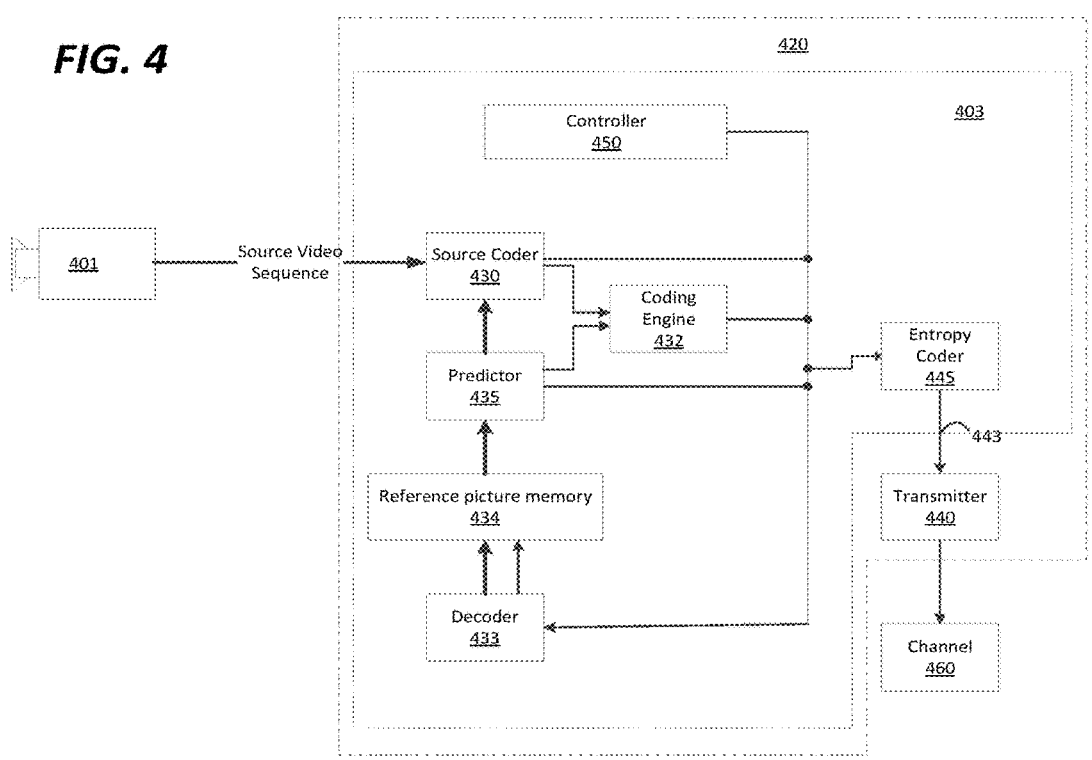
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401)(that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 5:
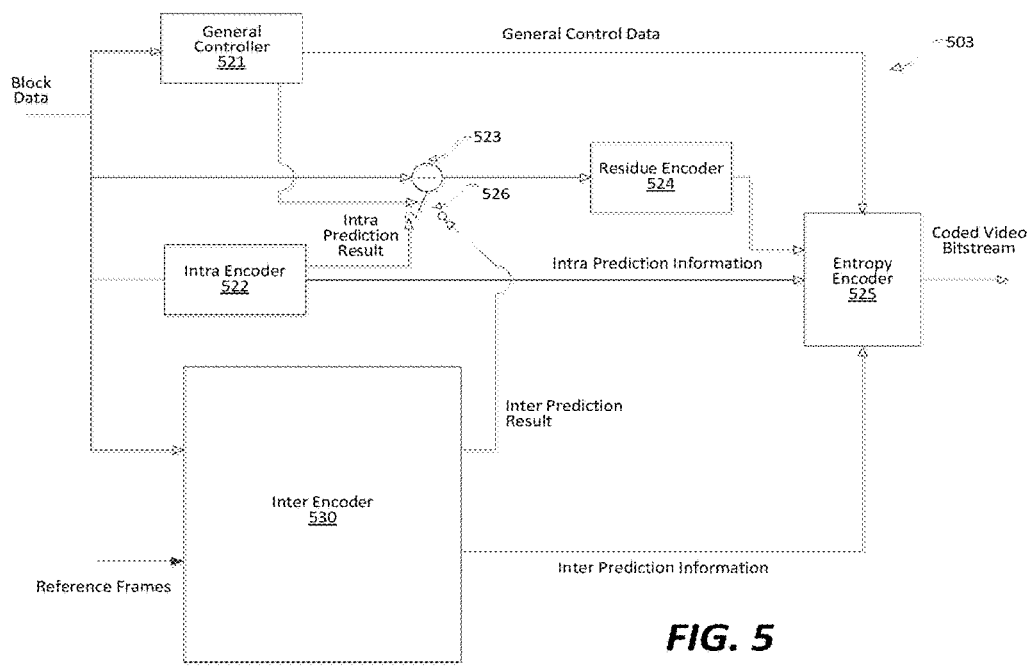
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using the intra block copy mode, inter mode, or bi-prediction mode using, for example, rate-distortion optimization. When the processing block is to be coded in the intra block copy mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521) and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).

The general controller (521) is configured to determine general control data and control other components of the video encoder (503) based on the general control data. In an example, the general controller (521) determines the mode of the block, and provides a control signal to the switch (526) based on the mode. For example, when the mode is the intra, the general controller (521) controls the switch (526) to select the intra block copy mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients.

The entropy encoder (525) is configured to format the bitstream to include the encoded block. The entropy encoder (525) is configured to include various information according to a suitable standard, such as HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
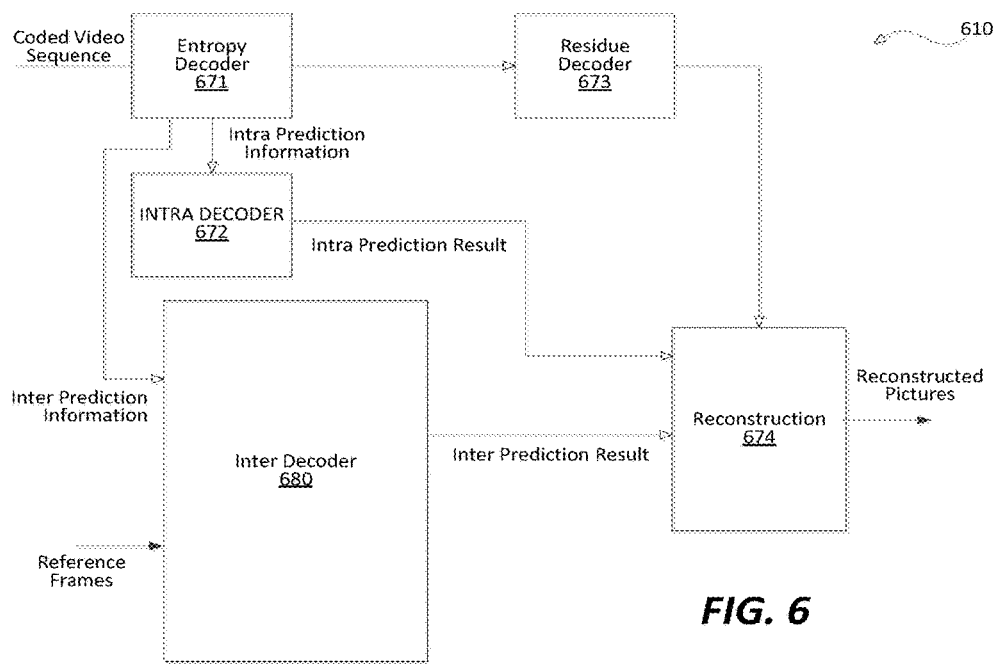
FIG. 6 shows a block diagram of a decoder in accordance with another embodiment.

FIG. 6 shows a diagram of a video decoder (610) according to another embodiment of the disclosure. The video decoder (610) is configured to receive a coded pictures that are part of a coded video sequence, and decode the coded picture to generate a reconstructed picture. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder (672) or the inter decoder (680) respectively residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter QP), and that information may be provided by the entropy decoder (671) (datapath not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403) and (503), and the video decoders (210), (310) and (610) can be implemented using any suitable technique. In an embodiment, the video encoders (203), (403) and (503), and the video decoders (210), (310) and (610) can be implemented using one or more integrated circuits. In another embodiment, the video encoders (203), (403) and (403), and the video decoders (210), (310) and (610) can be implemented using one or more processors that execute software instructions.

Block based compensation from a different picture may be referred to as motion compensation. Block compensation may also be done from a previously reconstructed area within the same picture, which may be referred to as intra picture block compensation or intra block copy. For example, a displacement vector that indicates an offset between a current block and the reference block is referred to as a block vector. According to some embodiments, a block vector points to a reference block that is already reconstructed and available for reference. Also, for parallel processing consideration, a reference area that is beyond a tile/slice boundary or wavefront ladder-shaped boundary may also be excluded from being referenced by the block vector. Due to these constraints, a block vector may be different from a motion vector (MV) in motion compensation, where the motion vector can be at any value (positive or negative, at either x or y direction).

Figure 7:
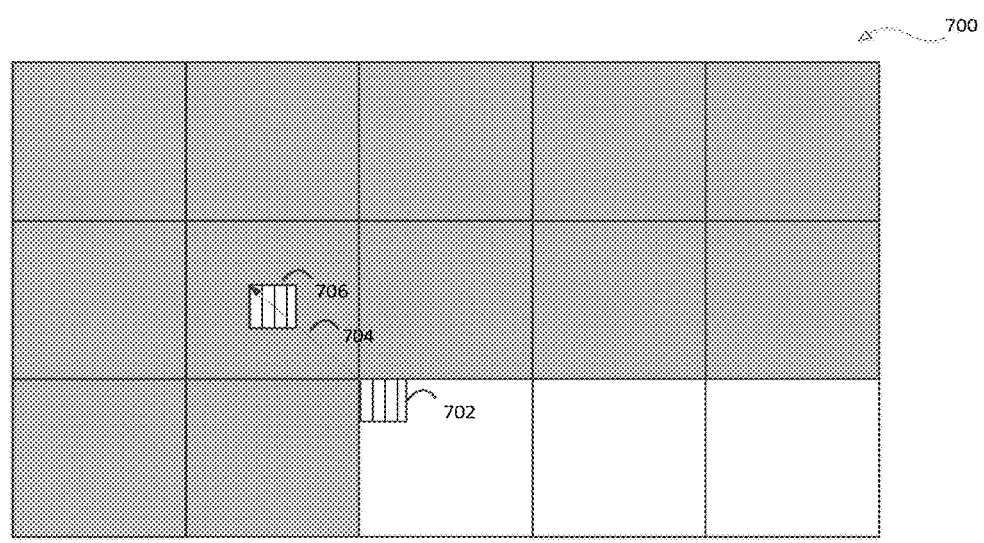
FIG. 7 is a schematic illustration of intra picture block compensation.

FIG. 7 illustrates an embodiment of intra picture block compensation (e.g., intra block copy mode). In FIG. 7, a current picture (700) includes a set of blocks that have already been coded/decoded (i.e., gray colored blocks) and a set of blocks that have yet to be coded/decoded (i.e., white colored blocks). A sub-block (702) of one of the blocks that have yet to be coded/decoded may be associated with a block vector (704) that points to another sub-block (706) that has previously been coded/decoded. Accordingly, any motion information associated with the sub-block (706) may be used for the coding/decoding of sub-block (702).

According to some embodiments, the coding of a block vector (e.g., sub-block (702)) is explicit. In other embodiments, the coding of the block vector is implicit. In the explicit mode, the difference between a block vector and its predictor is signaled, whereas in the implicit mode, the block vector is recovered from its predictor in a similar way as a motion vector prediction in merge mode. The resolution of a block vector, in some embodiments, is restricted to integer positions. In other embodiments, the block vector points to fractional positions.

According to some embodiments, the use of the intra picture block compensation (i.e., intra block copy mode) at the block level, is signaled using a reference index, where a current decoded picture is treated as a reference picture, which is put in a last position of a reference picture list. This reference picture may also be managed together with other temporal reference pictures in a decoded picture buffer (DPB).

According to some embodiments, a reference block is flipped horizontally or vertically before being used to predict a current block (e.g., flipped intra block copy). In some embodiments, each compensation unit inside an M×N coding block is an M×1 or 1×N line (e.g., line based intra block copy).

According to some embodiments, motion compensation is performed at the block level, where the current block is the processing unit for performing motion compensation using the same motion information. In this regard, given the size of a block, all samples in the block will use the same motion information to form their prediction block. Examples of block level motion compensation include using spatial merge candidates, temporal candidates, and in bi-directional prediction, combinations of motion vectors from existing merge candidates.

Figure 8:
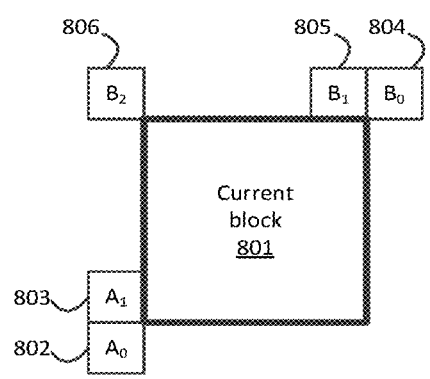
FIG. 8 is a schematic illustration of a current block and surrounding spatial merge candidates of the current block.

Referring to FIG. 8, a current block (801) comprises samples that have been found by the encoder/decoder during the motion search process to be predictable from a previous block of the same size that has been spatially shifted. In some embodiments, instead of coding that MV directly, the MV can be determined from metadata associated with one or more reference pictures, for example, from a most recent (in decoding order) reference picture, using the MV associated with either one of five surrounding samples, denoted A0, A0, and B0, B1, B2 (802 through 806, respectively). The blocks A0, A1, B0, B1, and B2 may be referred to as spatial merge candidates.

According to some embodiments, pattern matched motion vector derivation (PMMVD) mode is a technique in which motion information of a block is not signaled but derived at both the encoder and decoder sides. In the PMMVD mode, there may be two pattern matched motion vector derivation methods, for example bilateral matching and template matching.

Figure 9:
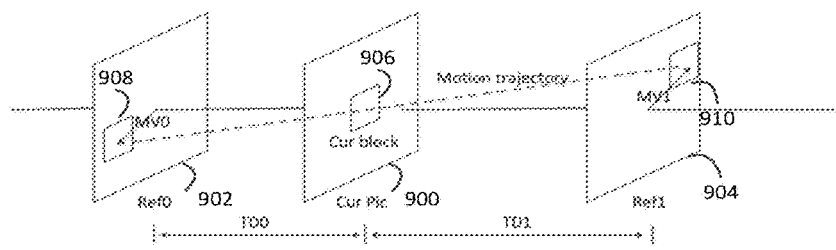
FIG. 9 is a schematic illustration of bilateral matching.

FIG. 9 illustrates a current picture (900) with current block (906), reference picture Ref0 (902) with reference block (908), and reference picture Ref1 (904) with reference block (910). As illustrated in FIG. 9, bilateral matching may be used to derive motion information of the current block (906) by finding the closest match between two blocks along the motion trajectory of the current block (906) in the two different reference pictures (902) and (904). Under the assumption of continuous motion trajectory, the motion vectors MV0 and MV1 pointing to the two reference blocks (908) and (910), respectively, are proportional to the temporal distances TD0 and TD1, respectively, between the current picture (900) and the two reference pictures (902) and (904). As an example, when MV0 and MV1 are determined, the prediction block of the current block (906) is generated by averaging two prediction blocks from two reference pictures indicated by MV0 and MV1, respectively. In some embodiments, when the current picture (900) is temporally between the two reference pictures (902) and (904), and the temporal distance from the current picture (900) to the two reference pictures (902) and (904) is the same, the bilateral matching becomes mirror based bi-directional MV.

Figure 10:
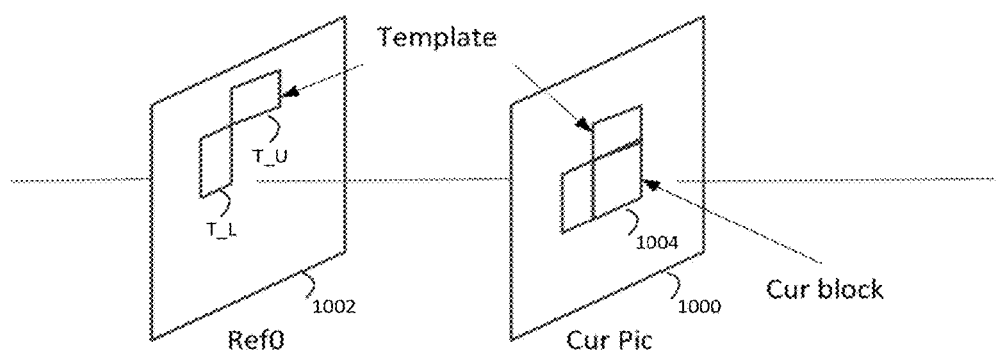
FIG. 10 is a schematic illustration of template matching.

According to some embodiments, template matching is used to derive motion information of the current CU by finding the closest match between a template (top and/or left neighbouring blocks of the current CU) in the current picture and a block (same size to the template) in a reference picture. FIG. 10 illustrates a current picture (1000) with a current block (1004). In the example illustrated in FIG. 10, a template has an upper part T_U and a lower part T_L. The template is used to determine a block in the reference picture Ref0 (1002) that is a closest match to the current block (1004). For example, in FIG. 10 the closest match of the T_U and T_L parts to the template is found between the current picture and reference picture Ref0 (1002). After the closest match is found, the motion information of the block in the reference picture Ref0 (1002) below, or otherwise adjacent to, the template (T_U, T_L) is used to derive the motion information of the current block (1004).

In intra block copy, a block vector may be signaled in explicit or implicit mode. The block vector in this context may be referred to as a signaled block vector. In some embodiments, a current block is predicted by a reference block from the current block's spatial neighboring area which has been reconstructed. The displacement from this current block to its reference block is not signaled, but instead, determined through a series of pattern matching derivations. For example, a region-based template matching method may be used, in which several regions' shapes and sizes are assumed in the reference area of the current picture by both the encoder and the decoder. At the decoder side, an index is parsed from the bitstream to select a region. Then template matching may be performed for all possible locations inside the region. The reference location with a minimum matching cost may be used as the predictor for the current block. The block vector from this derivation may be referred to as a derived block vector. For the block vector derivation process in a region, the starting point of the pattern matching, as well as the search order from one location to the next, may be pre-defined and known by both encoder and decoder.

The embodiments of the present disclosure improve intra block copy when both signaled and derived block vectors exist in the same picture. The signaled block vector may be realized by either using a reference index approach (e.g., identify the current picture as a reference picture) or using a block level flag under Advance Motion Vector Predictor (AMVP) mode. In either the reference index approach or the block level flag approach, the derived block vector can coexist with the signaled block vector in the same picture.

According to some embodiments, the intra block copy mode with the signaled block vector may be embedded into an inter coding syntax structure, where the current decoded picture is regarded as a reference picture. The usage of a signaled block vector may be through using a reference picture index pointing to the current picture, where when the current block is coded using the merge mode, and the selected merge candidate uses the current picture as its reference picture, then the current block will use the current picture as its reference picture as well. In this situation, the block vector for the current block may be inferred from the block vector of the selected merge candidate. The usage of a signaled block vector may also be through using the reference picture index pointing to the current picture when the current block is coded in explicit AMVP mode, where its block vector is signaled through block vector prediction and block vector difference coding.

According to some embodiments, a current block coded using the derived block vector may be indicated as a special merge mode. In the merge candidate list, if a specific merge candidate indicating this mode is chosen, both the encoder and decoder may perform block vector derivation throughout a region in a reference area. In some embodiments, both the region and the reference area may be predetermined by the decoder and encoder.

Figure 11:
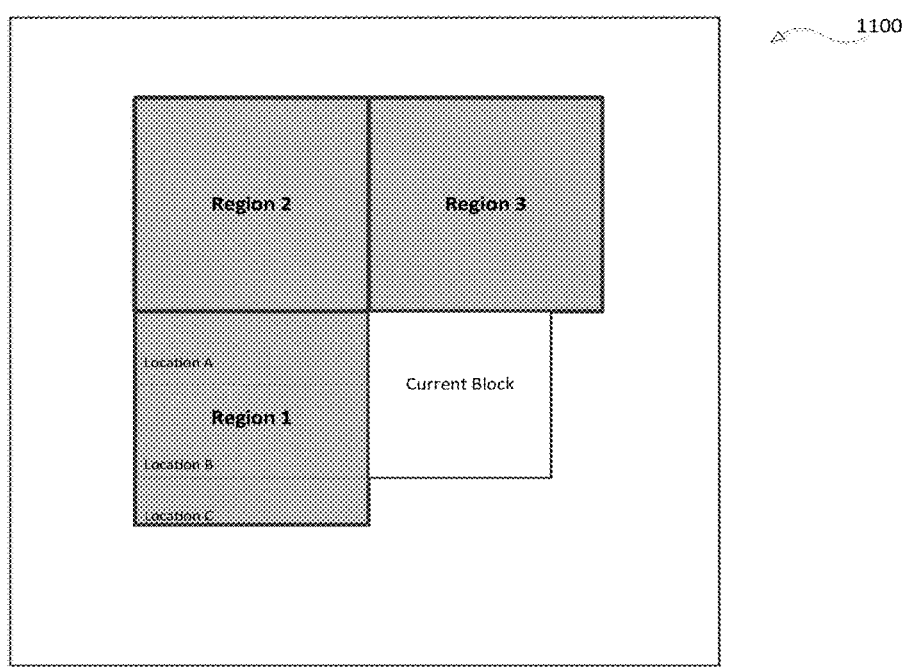
FIG. 11 is a schematic illustration of a picture having a plurality of regions.

In some embodiments, the special merge candidate is inserted after the N designated spatial neighboring positions, where N is greater than 1. For example, if there are five spatial neighboring positions in the merge list, this special merge candidate is placed in the list after these five candidates. Referring to the spatial neighbors illustrated in FIG. 8, this type of list may read as follows: $B_2$, $A_1$, $A_0$, $B_1$, $B_0$, [special merge candidate]. This special merge candidate is chosen, and if there is more than one possible region to perform block vector derivation, then an index pointing to the chosen region for performing block vector derivation may be signaled following the merge index signaling. For example, FIG. 11 illustrates an example picture (1100) that includes a current block that is currently being decoded, and three previously decoded regions: Region 1, Region 2, and Region 3. If the special merge candidate is chosen, then an index pointing to one of Region 1, Region 2, and Region 3 may be signaled following the merge index signaling. Furthermore, each region illustrated in FIG. 11 may be partitioned into different locations, where in a selected region, a template is compared to each location to find a location with a minimum difference with the template. For example, Region 1 may be partitioned into Location A, Location B, and Location C. When Region 1 is selected, a template is compared with each of these locations. Regions 2 and 3 may also be similarly partitioned.

In another embodiment, this special merge candidate is inserted into other positions in the merge candidate list. For example, this special merge candidate may be inserted in front of the merge candidate list, or at the end of all spatial and temporal neighbor-based candidates.

In another embodiment, the special merge candidate is conditionally inserted after the N designated spatial neighboring positions. For example, for each spatial or temporal merge candidate, if the inferred block vector for the current block points to one of the regions where block vector derivation is performed, then a special merge candidate is inserted into the candidate list. A region index is not necessary to be signaled in this case since the inferred block vector already points to the region to be searched. For example, in one scenario, it is assumed that the current block's neighboring area is divided into M (M>1) regions to perform block vector derivation, and it is also assumed that out of five spatial neighboring blocks, three are coded in the intra block copy mode. Each of the three blocks coded in the intra block copy mode has a respective block vector. When the block vector for the current block is inferred from each of these three neighboring blocks' block vectors, one inferred block vector points to region X (e.g., Region 1 in FIG. 11) and another one points to region Y (e.g., Region 2 of FIG. 11) of a plurality of regions. In this scenario, two special merge candidates are inserted into the candidate list, where selection of one special merge candidate results in performing block vector derivation in region X, and selection of the other special merge candidate results in performing block vector derivation in region Y. However, if there is no inferred block vector that points to one of the plurality of regions in a reference area that neighbors a current block, no special merge candidate is inserted into the merge list. In another embodiment, where the special merge candidate is conditionally inserted after the N designated spatial neighboring positions, if there is no inferred block vector that points to one of the plurality of regions in the reference area that neighbors the current block, a special merge candidate followed by a region index signaling is inserted into the candidate list.

In some embodiments, if the signaled block vector is implemented using a block level flag, referred to as an intra block copy (IBC) flag, when a current block is coded in the merge mode, treating the derived block vector as a special merge mode may also include inserting a special candidate in the merge candidate list as discussed above. In this regard, no special syntax is needed to signal if a current block is coded in intra block copy mode. The coding mode of the current block may be decided based on the merge candidate's coding mode.

According to some embodiments, the derived block vector is determined in accordance with an explicit mode (e.g., AMVP mode). For example, for a current block coded using the derived block vector, the mode for deriving a block vector may be indicated as a special AMVP mode. In the reference index approach, when the reference index points to a current picture as the reference picture for the current block, the current block is determined to be coded in the intra block copy mode. In the block level flag approach, when the IBC flag is true, the current block is determined to be coded in intra block copy mode.

In some embodiments, where the explicit mode is used, and when the current block is coded in intra block copy mode, a flag is signaled to indicate whether the block vector is signaled using traditional AMVP mode (block vector prediction+block vector difference coding) or derived. In one embodiment, if the block vector is derived, a region index is signaled if there is more than one possible region to perform block vector derivation. For example, referring to FIG. 11, if the block vector is derived, one of Region 1, Region 2, and Region 3 may be signaled by a region index. If the block vector is the derived block vector, in another embodiment, the derived block vector is possible only when there is at least one block vector predictor from the AMVP mode that points to one of a plurality of regions that neighbor a current block. In some embodiments, when none of the block vector predictors point to any one of the plurality of regions, the signaling flag for block vector derivation is not signaled, but instead, inferred to be false. In another embodiment, when the signaling flag for block vector derivation is true, the region pointed by the first available block vector predictor in the merge candidate list is used for the block vector derivation, and therefore, in this situation, there is no need to signal the region index.

According to some embodiments, a signaled or derived block vector predictor of a previously decoded block is used for a current block that is coded in intra block copy mode. The predictor may be used in either the signaled block vector prediction mode or the derived block vector prediction mode. If a reference sample predictor for a block is generated by averaging N (N>1) multiple reference blocks using region-based template matching, in one embodiment, the displacement vector of a reference block that has a minimum template matching cost is recorded as the block vector of this neighboring block. In another embodiment, where the reference sample predictor for a block is generated by averaging N (N>1) multiple reference blocks using region-based template matching, these N displacement vectors of the reference blocks are all recorded for future block vector prediction. The Sum of Absolute Differences (SAD) in the template pixels may be used to define a cost. When template matching is used in a region, the best several locations are selected. For example, for a coding block and a selected region, location A has the smallest template cost, location B has second best cost. The reference blocks at location A and location B may then be weighted and averaged to generate the final prediction block. However, when this block becomes a previous coded block and its block vector is used for predicting a current block, there will be more than one block vector used in this reference block (e.g., a first block vector pointing to location A, a second block vector pointing to location B, etc.). In this example, the block vector pointing to location A (e.g., block vector having the best cost) may be used as the block vector predictor. The displacement vector in this example refers to the block vector pointing to one of the selected locations (e.g., location A).

In some embodiments, if the reference sample predictor for a block is generated by searching for one best reference block (e.g., block having the minimum template matching cost) in accordance with region-based template matching, the displacement vector of the reference block which has the minimum template matching cost is recorded as a block vector of this neighboring block.

In some embodiments, if the current block vector is coded as a signaled block vector, either explicitly or implicitly, a list of block vector predictors is created from the block vectors of the current block's spatial or temporal neighboring blocks, or from predetermined values known by both encoder and decoder. In this embodiment, if a neighboring block is coded by region-based template matching, the displacement vector(s) from this neighboring block are used as block vector predictors for the current block.

In some embodiments, if the current block vector is coded as a derived block vector using template matching methods, then when selecting one of a plurality of regions for block vector derivation, the block vectors of neighboring coded blocks are used to predict which of the regions is chosen for performing block vector derivation. In one embodiment, block vector derivation is only performed in a region when a block vector predictor points to this region.

In some embodiments, the block vectors of neighboring coded blocks can be used to indicate the priority of the regions. For example, for regions with higher priority, the region index of these higher priority regions may be coded using a shorter codeword than regions with lower priority. In some embodiments, when the block vector predictors of a current block's top and/or left neighboring blocks points to one of the regions for the current block, this region is assigned a higher priority and uses a shorter codeword for the region index of this region.

Figure 12:
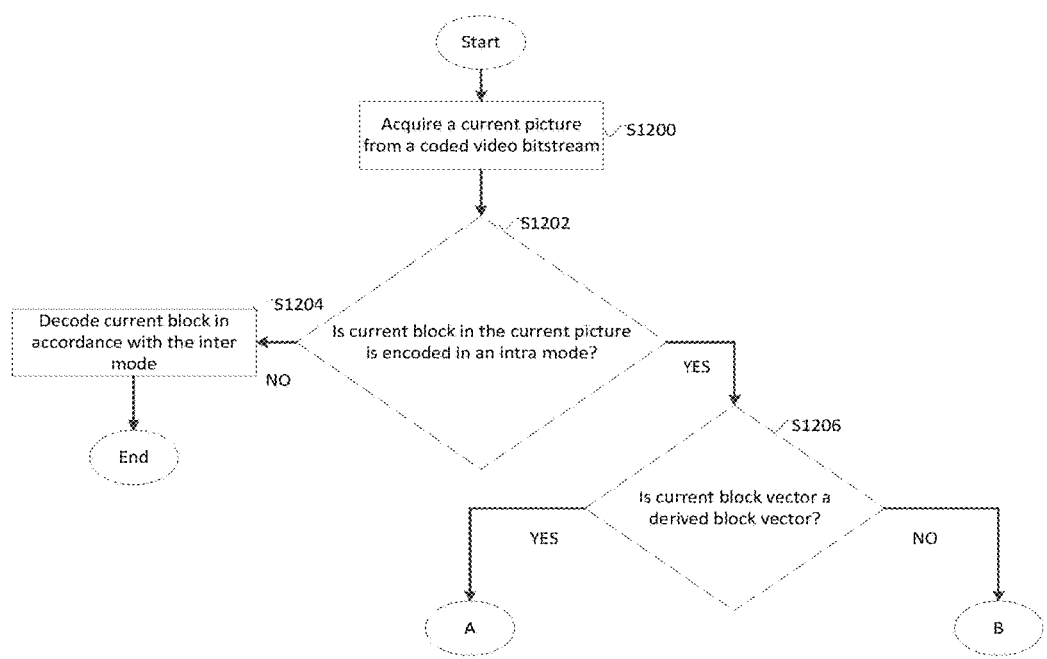
FIGS. 12-14 illustrate an embodiment of a process performed by an encoder or decoder.

FIG. 12 illustrates an embodiment of a process performed by a decoder such as video decoder (610). The process may generally start at step (S1200) where a current picture is acquired from a coded video bit stream. The process proceeds to step (S1202) to determine whether a current block in the current picture is encoded in an intra block copy mode. If the current block is not encoded in an intra block copy mode, the process proceeds to step (S1204) where the current block is decoded in accordance with the inter mode in which case the block may be reconstructed using a characteristic from a block located in a reference picture that is different than the current picture.

Returning to step (S1202), if the current block is encoded in the intra block copy mode, the process proceeds to step (S1206) to determine if a current block vector for the current block is a derived block vector. If the current block vector is a derived block vector, the process proceeds from step (S1206) to process A (illustrated in FIG. 13). If the current block vector is not a derived block vector, the process proceeds from step (S1206) to process B (illustrated in FIG. 14). For example, if the block vector of the current block is not a derived block vector, then the current block vector may be a signaled block vector.

Figure 13:
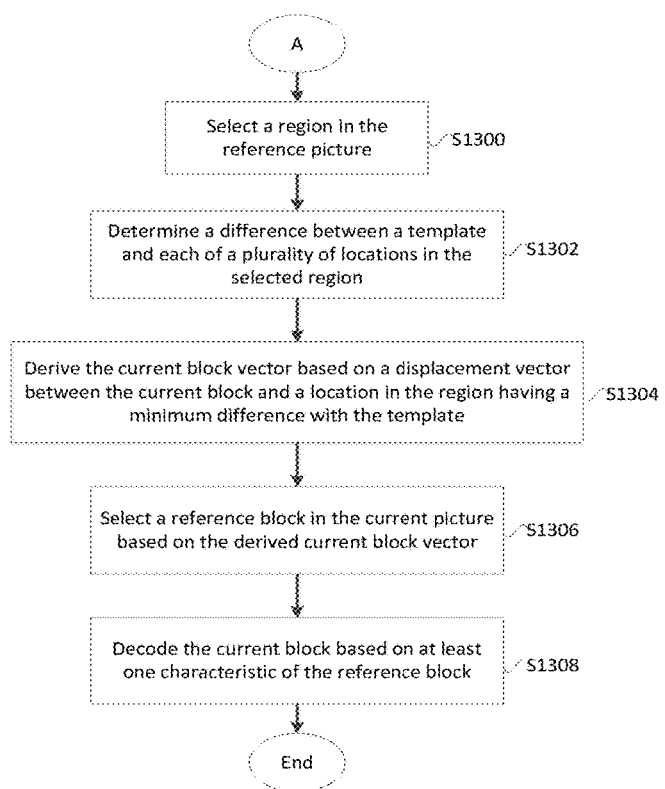

FIG. 13 illustrates an embodiment for process A. Process A may be entered when a block vector for a current block is a derived block vector. Since process A is entered when the current block is encoded in the intra block copy mode, a reference picture is the same as the current picture. Process A may generally start at step (S1300) where a region in the reference picture is selected. As an example, referring to FIG. 11, one of Region 1, Region 2, and Region 3 is selected. The selection of a region may be based on a signaled index included in the coded video bitstream, as discussed above. The process proceeds to step (S1302) where a difference between a template and each of a plurality of locations in the selected region is determined. For example, referring to FIG. 10, the template that includes the parts T_U and T_L may be used in a plurality of locations of a selected region such as Region 1 (illustrated in FIG. 11). The difference between the template in each of these locations may be recorded.

The process proceeds to step (S1304) where a current block vector is derived based on a displacement vector between the current block and a location in the region having a minimum difference with the template. For example, if Region 1 includes Location A, Location B, and Location C, and Location A, compared to the other locations, provides a minimum difference with the template, then a current block vector may be derived based on a displacement vector between Location A and the current block.

The process proceeds to step (S1306) where a reference block in the current picture is selected based on the derived current block vector. The process proceeds from step (S1306) to step (S1308) where a current block is decoded based on at least one characteristic of the reference block. As an example, referring to FIG. 7, block (702) may be a current block, where the current block is decoded based on block (706), which is pointed to by block vector (704).

Figure 14:
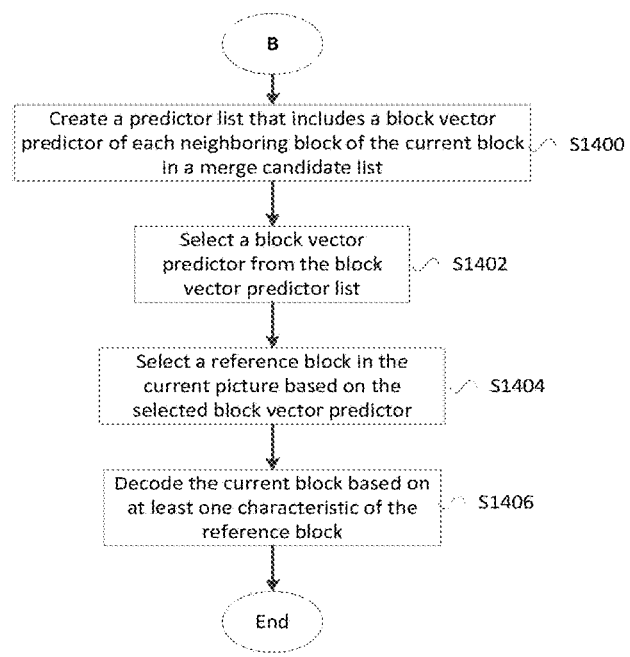

FIG. 14 illustrates an embodiment of process B. Process B may be entered when a current block vector for a current block is a signaled block vector. Since process B is entered when the current block is encoded in the intra block copy mode, a reference picture is the same as the current picture. The process may generally start at step (S1400) where a predictor list that includes a block vector predictor of each neighboring block of the current block in a merged candidate list is created. For example, referring to FIG. 8, a merge candidate list may include blocks $A_1$, $B_2$, and $B_1$. A predictor list may be created using the block vectors from each of these candidates in the merged candidate list.

The process proceeds to step (S1402) where a block vector is selected from the block vector predictor list. For example, the block vector for merge candidate $B_2$ may be selected. The process proceeds to step (S1404) where a reference block in the current picture is selected based on the selected block vector predictor. The process proceeds to step (S1406) where a current block is decoded based on at least one characteristic of the reference block in a similar manner as described above for step (S1308) (illustrated in FIG. 13).

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
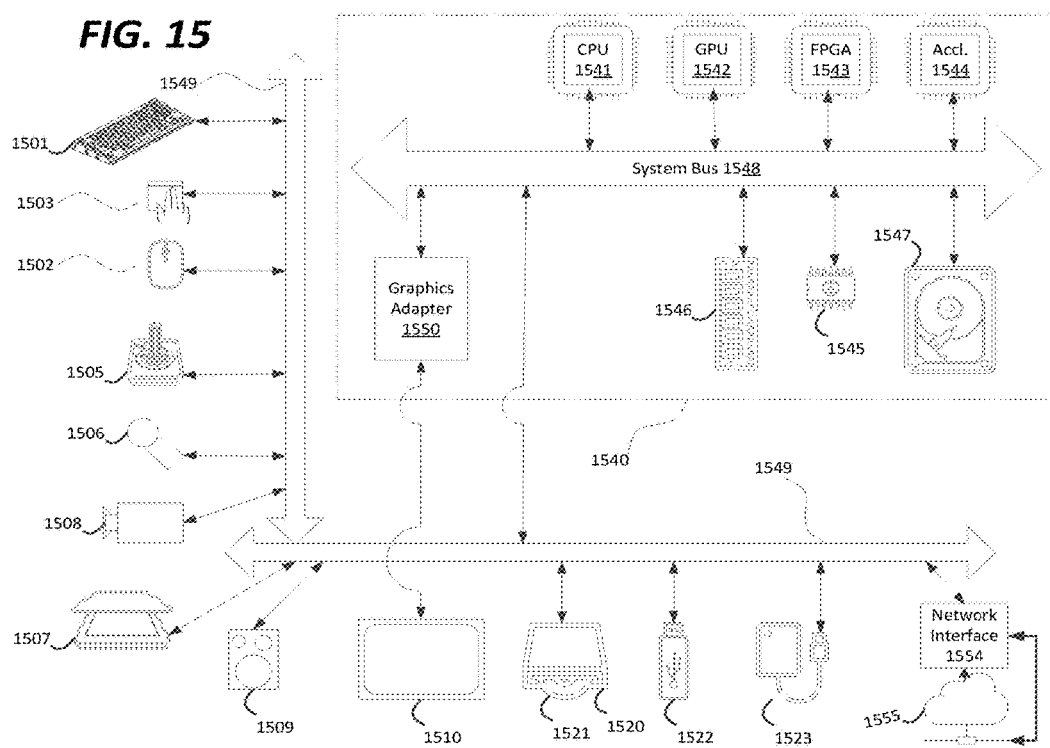
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding for a video decoder, includes acquiring a current picture from a coded video bitstream; determining whether a current block in the current picture is coded in an intra block copy mode; in response to the determination that the current block is coded in the intra block copy mode, determining whether a current block vector of the current block is one of (i) a signaled block vector and (ii) a derived block vector; and in response to determining that the current block vector is the derived block vector: (i) selecting a region in the reference picture, the region divided into a plurality of locations, (ii) determining a difference between a template and each of the plurality of locations in the region, (iii) deriving the current block vector based on a displacement vector between the current block and a location in the region having a minimum difference with the template with respect to each other location in the region, (iv) selecting a reference block in the current picture based on the derived current block vector, and (v) decoding the current block based on at least one characteristic of the reference block.

(2) The method of feature (1), in which determining whether the current block vector is one of the signaled block vector and the derived block vector further includes selecting a candidate block from a merge candidate list that indicates that the current block is the derived block vector.

(3) The method of feature (2), in which the selected candidate block that indicates that the current block is the derived block vector is inserted after each neighboring block included in the merge candidate list.

(4) The method of feature (2), in which the selected candidate block that indicates that the current block is the derived block vector is inserted at a beginning of the merge candidate list.

(5) The method of any one of features (2)-(4), in which the selecting the region is based on an index included in the merge candidate list.\

(6) The method of any of features (2)-(5), in which the selected candidate that indicates that the current block vector is derived includes a block vector predictor of a neighboring block of the current block included in the candidate list, and wherein the selecting the region in the reference picture is based on the block vector predictor.

(7) The method of any one of features (2)-(5), in which the selected candidate that indicates that the current block vector is the derived clock vector includes a block vector predictor of a temporal block of the current block included in the candidate list, and in which the selecting the region in the reference picture is based on the block vector predictor.

(8) The method of any one of features (1)-(7), the current block vector is determined as being one of the signaled block vector and the derived block vector based on a flag included in the coded video bitstream.

(9) The method of any one of features (1)-(8), the method further including in response to determining that the current block vector is the signaled block vector, creating a predictor list that includes a block vector predictor of each neighboring block of the current block in a merge candidate list that is encoded in the intra block copy mode; selecting a block vector predictor from the block vector predictor list; selecting a reference block in the current picture based on the selected block vector predictor; and decoding the current block based on at least one characteristic of the reference block.

(10) The method of feature (9), in which the predictor list further includes a block vector predictor of each temporal block in the merge candidate list that is encoded in the intra block copy mode.

(11) A video decoder for video decoding including processing circuitry configured to acquire a current picture from a coded video bitstream, determine whether a current block in the current picture is coded in an intra block copy mode, in response to the determination that the current block is coded in the intra block copy mode, determine whether a current block vector of the current block is one of (i) a signaled block vector and (ii) a derived block vector, and in response to the determination that the current block vector is the derived block vector: (i) select a region in the reference picture, the region divided into a plurality of locations, (ii) determine a difference between a template and each of the plurality of locations in the region, (iii) derive the current block vector based on a displacement vector between the current block and a location in the region having a minimum difference with the template with respect to each other location in the region, (iv) select a reference block in the current picture based on the derived current block vector, and (v) decode the current block based on at least one characteristic of the reference block.

(12) The video decoder of feature (11), in which the determination whether the current block vector is one of the signaled block vector and the derived block vector further includes the processing circuitry configured to select a candidate block from a merge candidate list that indicates that the current block is the derived block vector.

(13) The video decoder of feature (12), in which the selected candidate block that indicates that the current block is the derived block vector is inserted after each neighboring block included in the merge candidate list.

(14) The video decoder of feature (12), in which the selected candidate block that indicates that the current block is the derived block vector is inserted at a beginning of the merge candidate list.

(15) The video decoder of feature (12), in which the selection of the region is based on an index included in the merge candidate list.

(16) The video decoder of any one of features (12)-(15), in which the selected candidate that indicates that the current block vector is derived includes a block vector predictor of a neighboring block of the current block included in the candidate list, and in which the selection of the region in the reference picture is based on the block vector predictor.

(17) The video decoder of any one of features (12)-(15), in which the selected candidate that indicates that the current block vector is the derived clock vector includes a block vector predictor of a temporal block of the current block included in the candidate list, and wherein the selection of the region in the reference picture is based on the block vector predictor.

(18) The video decoder of any one of features (11)-(17), in which the current block vector is determined as being one of the signaled block vector and the derived block vector based on a flag included in the coded video bitstream.

(19) The video decoder of any one of features (11)-(18), in which the processing circuitry is further configured to: in response to the determination that the current block vector is the signaled block vector, create a predictor list that includes a block vector predictor of each neighboring block of the current block in a merge candidate list that is encoded in the intra block copy mode, select a block vector predictor from the block vector predictor list, select a reference block in the current picture based on the selected block vector predictor, and decode the current block based on at least one characteristic of the reference block.

(20) A non-transitory computer readable medium having instructions stored therein, which when executed by a processor in a video decoder causes the processor to execute a method including acquiring a current picture from a coded video bitstream; determining whether a current block in the current picture is coded in an intra block copy mode; in response to the determination that the current block is coded in the intra block copy mode, determining whether a current block vector of the current block is one of (i) a signaled block vector and (ii) a derived block vector; and in response to determining that the current block vector is the derived block vector: (i) selecting a region in the reference picture, the region divided into a plurality of locations, (ii) determining a difference between a template and each of the plurality of locations in the region, (iii) deriving the current block vector based on a displacement vector between the current block and a location in the region having a minimum difference with the template with respect to each other location in the region, (iv) selecting a reference block in the current picture based on the derived current block vector, and (v) decoding the current block based on at least one characteristic of the reference block.

The invention claimed is:

1. A method of video decoding for a video decoder, comprising:
acquiring a current picture from a coded video bitstream;
determining whether a current block in the current picture is coded in an intra block copy mode;

in response to the determination that the current block is coded in the intra block copy mode, determining whether a current block vector of the current block is one of (i) a signaled block vector and (ii) a derived block vector; and in response to determining that the current block vector is the derived block vector:
(i) selecting a region in the reference picture, the region divided into a plurality of locations,
(ii) determining a difference between a template and each of the plurality of locations in the region,
(iii) deriving the current block vector based on a displacement vector between the current block and a location in the region having a minimum difference with the template with respect to each other location in the region,
(iv) selecting a reference block in the current picture based on the derived current block vector, and
(v) decoding the current block based on at least one characteristic of the reference block.

2. The method of claim 1, wherein determining whether the current block vector is one of the signaled block vector and the derived block vector further includes selecting a candidate block from a merge candidate list that indicates that the current block is the derived block vector.

3. The method of claim 2, wherein the selected candidate block that indicates that the current block is the derived block vector is inserted after each neighboring block included in the merge candidate list.

4. The method of claim 2, wherein the selected candidate block that indicates that the current block is the derived block vector is inserted at a beginning of the merge candidate list.

5. The method of claim 2, wherein the selecting the region is based on an index included in the merge candidate list.

6. The method of claim 2, wherein the selected candidate that indicates that the current block vector is derived includes a block vector predictor of a neighboring block of the current block included in the candidate list, and wherein the selecting the region in the reference picture is based on the block vector predictor.

7. The method of claim 2, wherein the selected candidate that indicates that the current block vector is the derived clock vector includes a block vector predictor of a temporal block of the current block included in the candidate list, and wherein the selecting the region in the reference picture is based on the block vector predictor.

8. The method of claim 1, wherein the current block vector is determined as being one of the signaled block vector and the derived block vector based on a flag included in the coded video bitstream.

9. The method of claim 1, the method further comprising:
in response to determining that the current block vector is the signaled block vector, creating a predictor list that includes a block vector predictor of each neighboring block of the current block in a merge candidate list that is encoded in the intra block copy mode;
selecting a block vector predictor from the block vector predictor list;
selecting a reference block in the current picture based on the selected block vector predictor; and
decoding the current block based on at least one characteristic of the reference block.

10. The method of claim 9, wherein the predictor list further includes a block vector predictor of each temporal block in the merge candidate list that is encoded in the intra block copy mode.

11. A video decoder for video decoding, comprising:
processing circuitry configured to:
acquire a current picture from a coded video bitstream,
determine whether a current block in the current picture is coded in an intra block copy mode,
in response to the determination that the current block is coded in the intra block copy mode, determine whether a current block vector of the current block is one of (i) a signaled block vector and (ii) a derived block vector, and
in response to the determination that the current block vector is the derived block vector:
(i) select a region in the reference picture, the region divided into a plurality of locations,
(ii) determine a difference between a template and each of the plurality of locations in the region,
(iii) derive the current block vector based on a displacement vector between the current block and a location in the region having a minimum difference with the template with respect to each other location in the region,
(iv) select a reference block in the current picture based on the derived current block vector, and
(v) decode the current block based on at least one characteristic of the reference block.

12. The video decoder of claim 11, wherein the determination whether the current block vector is one of the signaled block vector and the derived block vector further includes the processing circuitry configured to select a candidate block from a merge candidate list that indicates that the current block is the derived block vector.

13. The video decoder of claim 12, wherein the selected candidate block that indicates that the current block is the derived block vector is inserted after each neighboring block included in the merge candidate list.

14. The video decoder of claim 12, wherein the selected candidate block that indicates that the current block is the derived block vector is inserted at a beginning of the merge candidate list.

15. The video decoder of claim 12, wherein the selection of the region is based on an index included in the merge candidate list.

16. The video decoder of claim 12, wherein the selected candidate that indicates that the current block vector is derived includes a block vector predictor of a neighboring block of the current block included in the candidate list, and wherein the selection of the region in the reference picture is based on the block vector predictor.

17. The video decoder of claim 12, wherein the selected candidate that indicates that the current block vector is the derived clock vector includes a block vector predictor of a temporal block of the current block included in the candidate list, and wherein the selection of the region in the reference picture is based on the block vector predictor.

18. The video decoder of claim 11, wherein the current block vector is determined as being one of the signaled block vector and the derived block vector based on a flag included in the coded video bitstream.

19. The video decoder of claim 11, wherein the processing circuitry is further configured to:
in response to the determination that the current block vector is the signaled block vector, create a predictor list that includes a block vector predictor of each neighboring block of the current block in a merge candidate list that is encoded in the intra block copy mode, select a block vector predictor from the block vector predictor list, select a reference block in the current picture based on the selected block vector predictor, and decode the current block based on at least one characteristic of the reference block.

20. A non-transitory computer readable medium having instructions stored therein, which when executed by a processor in a video decoder causes the processor to execute a method comprising:

acquiring a current picture from a coded video bitstream;

determining whether a current block in the current picture is coded in an intra block copy mode;

in response to the determination that the current block is coded in the intra block copy mode, determining whether a current block vector of the current block is one of (i) a signaled block vector and (ii) a derived block vector; and in response to determining that the current block vector is the derived block vector:

(i) selecting a region in the reference picture, the region divided into a plurality of locations, (ii) determining a difference between a template and each of the plurality of locations in the region, (iii) deriving the current block vector based on a displacement vector between the current block and a location in the region having a minimum difference with the template with respect to each other location in the region, (iv) selecting a reference block in the current picture based on the derived current block vector, and (v) decoding the current block based on at least one characteristic of the reference block.

* * * * *